United States Patent [19]

Shlomot et al.

[11] Patent Number: 5,699,481
[45] Date of Patent: Dec. 16, 1997

[54] TIMING RECOVERY SCHEME FOR PACKET SPEECH IN MULTIPLEXING ENVIRONMENT OF VOICE WITH DATA APPLICATIONS

[75] Inventors: Eyal Shlomot, Irvine; Michael J. Simpson, Buena Park; Qiang Ye, Irvine, all of Calif.

[73] Assignee: Rockwell International Corporation, Newport Beach, Calif.

[21] Appl. No.: 443,651

[22] Filed: May 18, 1995

[51] Int. Cl.$^6$ .................................. G10L 9/14; H04J 3/07
[52] U.S. Cl. ..................... 395/2.37; 395/2.17; 395/2.19; 395/2.32; 370/505
[58] Field of Search ..................... 395/2.1, 2.17, 395/2.19, 2.3, 2.32, 2.37; 370/60, 94.1, 505

[56] References Cited

U.S. PATENT DOCUMENTS

| | | | |
|---|---|---|---|
| 4,100,377 | 7/1978 | Flanagan | 370/435 |
| 4,618,936 | 10/1986 | Shiono | 395/2.76 |
| 4,882,754 | 11/1989 | Weaver et al. | 395/2.1 |
| 4,914,650 | 4/1990 | Sriram | 370/235 |
| 5,020,058 | 5/1991 | Holden et al. | 370/474 |
| 5,253,326 | 10/1993 | Young | 395/2.09 |

OTHER PUBLICATIONS

M.M. Lara–Barron and G.B. Lockhart, "Speech Encoding and Reconstruction for Packet–Based Networks", IEE Colloquium No. 199: Coding for Packet Video and Speech Transmission, Sep. 1992.

M.H. Sherif and A. Crossman, "Overview of Speech Packetization", IEEE 1995 Symposium on Computers and Communications, Jun. 1995.

*Primary Examiner*—Allen R. MacDonald
*Assistant Examiner*—Tálivaldis Ivars Šmits
*Attorney, Agent, or Firm*—William C. Cray; Philip K. Yu

[57] ABSTRACT

Multiple speech bit-stream frame buffers are used between the controller and the speech decoder. Whenever excessive or missing speech packages are detected, the speech decoder switches to a special corrective mode. If there is too much, the buffered frames are played out fast; if there is too little the buffered frames are played out slowly. For the fast play, some speech information has to be discarded, while for the slow play some speech-like information has to be synthesized. The speech may be handled in sub-frame units, which may be 52 samples at a time. Low energy, silent or unvoiced sub-frames, which also indicate non-periodicity, are detected and manipulated. Moreover, the decoded signal is manipulated at the excitation phase, before the final LPC synthesis filter, resulting in a transparent perceptual effect on the manipulated speech quality. Additionally, the buffers are enlarged such that the problem caused by controller asynchronicity is eliminated. Further, for bulk delay caused by multiplexing data and speech transmissions, the buffers maintain the smallest number of speech packets necessary to prevent buffer underflow during a data packet transmission while minimizing speech delay and preserving data transmission efficiency.

25 Claims, 5 Drawing Sheets

FIGURE 1(a)

Figure 1(b) Speech CODEC

TIMING RECOVERY SCHEME FOR PACKET SPEECH IN MULTIPLEXING ENVIRONMENT OF VOICE WITH DATA APPLICATIONS

FIELD OF THE INVENTION

The present invention relates to communication systems and more particularly relates to communication systems capable of transferring both voice and data.

ART BACKGROUND

PSTN Analog telephone lines are still the dominating medium for communication. The analog line, initially designed for analog speech, is now used extensively for digital data communications between computers through "modems", i.e. modulator-demodulator.

In the information society, there is a growing need for people at different sites to communicate with each other such that greater resources may be shared and synergized. Conventionally, if speech and data should be simultaneously communicated between two sites, two communication channels, e.g. two telephone lines, would be required, one for analog speech and the other for digital data. As modems become faster and more capable, they open the door to simultaneously transmitting digitized speech and digital data over the same channel (line).

Also, research and development is under way in the industry for having voice, data and video transmission in an multiplexing environment for multimedia applications.

Such systems, which combine the simultaneous real-time transmission of digitized speech and data, are called DSVD ("Digital Simultaneous Voice over Data"). The speech, as input to such a system, is sampled, digitized, compressed and packetized to form a speech package, which is denoted as "Coded Speech Package" (CSP). The CSP's may then be multiplexed with data packages and transmitted by a modem through a telephone line to the other system.

It should be noted that in the following description, the terms "package" and "packet" are used interchangeably and should be understood as such by those skilled in the art.

A typical DSVD communication system is illustrated in a simplified block diagram in FIG. 1. A communication channel such as a telephone line 45 is connected between two communication systems 1, 2 with each system having a modem 40, 50, a controller 30, 60, a speech codec ("coder/decoder") 10, 80, and a data terminal 20, 70, respectively. If, for example, speech is to be transferred from the system 1 on the left to the system 2 on the right of the diagram, the speech can be first applied to the speech codec 10 through a headset, handset or a microphone. Once spoken, the speech is sampled (typically around 8 KHz), digitized and compressed. The compression algorithm, such as a CELP (Code Excited Linear Prediction) as would be appreciated by those skilled in the art, divides the speech signal into time units commonly called "Frames", and the basic features, such as energy, spectral envelop, pitch etc., for each frame of the speech signal are extracted and quantized to binary representations. For each frame, all the binary representations are concatenated into a bit stream to form the CSP's.

The controller 30 takes the speech packets, multiplexes them with packets of data from a data terminal 20, if any, for a modem 40 to transmit to the other system through the communication channel 45.

The receiving modem 50 demodulates the analog signal received from the telephone line and sends the received multiplexed digital data into the controller 60. The controller 60 de-multiplexes the data packets from the speech packets. The data packets are sent to the data terminal 70, while the speech packets are sent to the speech codec 80. The speech codec 80 then de-packetizes the CSP into the binary representations of the speech parameters and uses them to build the synthesized speech, which is converted from digitally sampled signals (sampled at about 8 KHz) to analog signals to be output to a handset, a speaker or a headset. It should be noted the whole system can provide a full-duplex operation, i.e. packets of speech can also be sent from the speech codec 80 to the speech codec 10, and from the data terminal 70 to the data terminal 20 simultaneously.

It should also be noted that speech packets should be multiplexed, transmitted, received and demultiplexed in real-time basis to maintain their continuity. Data packets should be efficiently handled for fast transmission and reduced overhead.

Video packets 22 may also be multiplexed with speech and data packets for transmission, thus complicating the task. Similar to speech packets, video packets 21 may need to be in real-time to preserve the video quality.

When speech packets are used for real-time communications multiplexed with data packets or even video packets, a few timing-related problems may occur.

Figure 1A:
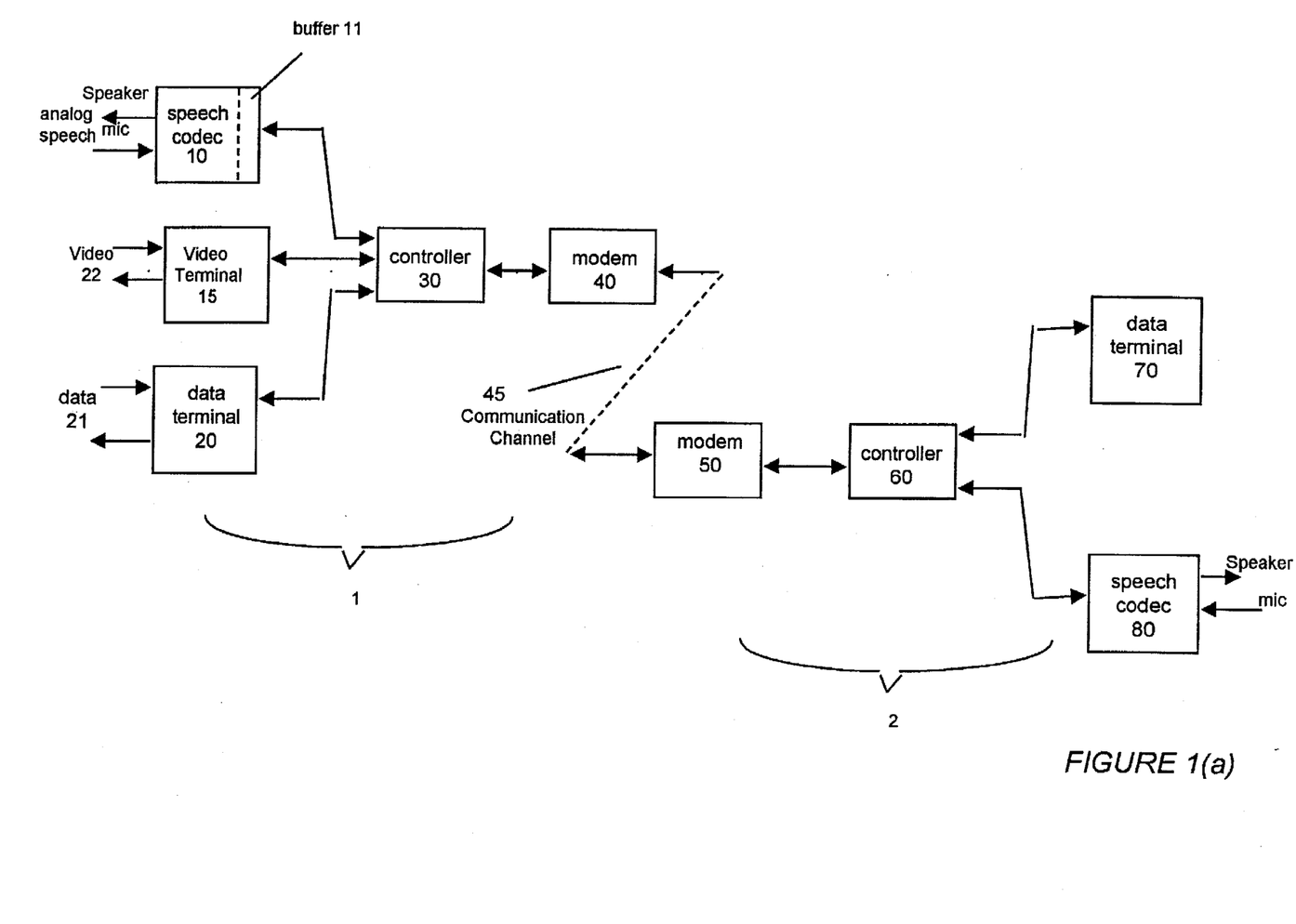
FIG 1(a) is the simplified system block diagram of a typical simultaneous voice and data system.
Figure 1B:
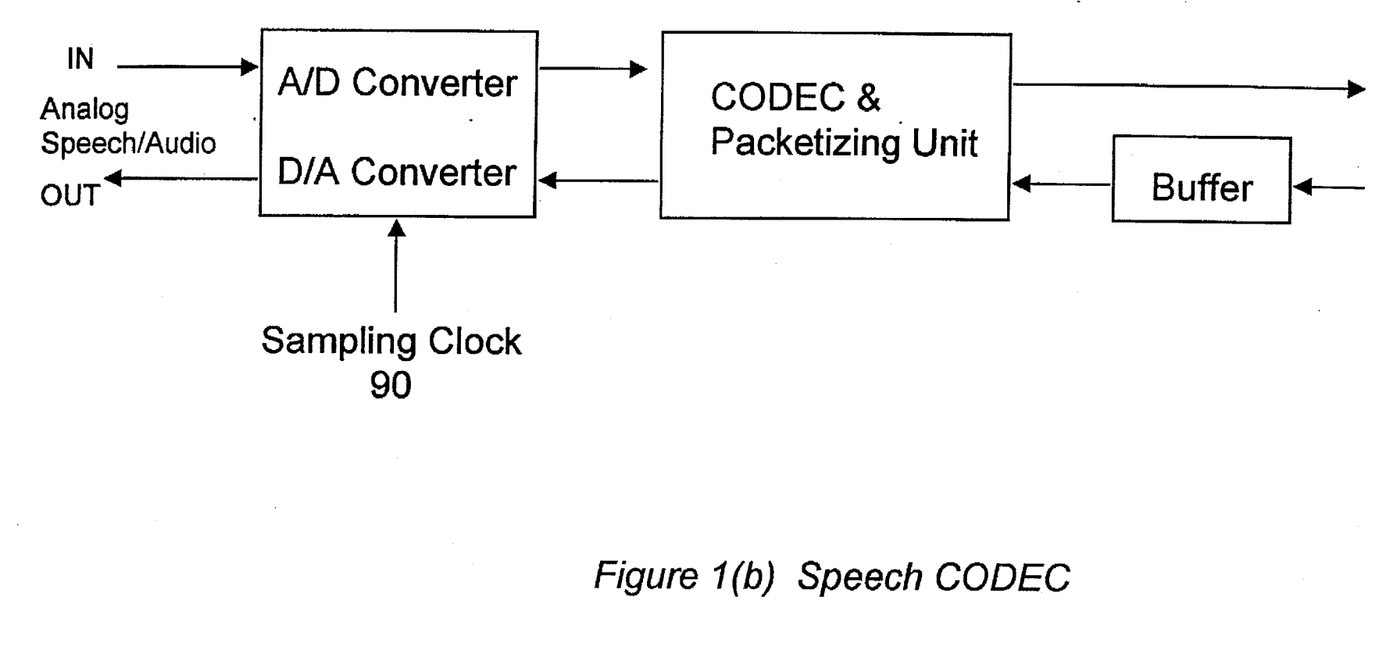
FIG. 1(b) is a diagram of an end unit, including a buffer, a speech codec and an A/D and D/A converter.

First is the problem of clock skew, which occurs when the codecs 10, 80 of the systems 1,2 experience different sampling rates. For example as shown in FIG. 1 (a), when the analog-to-digital (A/D) clock of the codec 10 skews from the digital-to-analog (D/A) clock of codec 80. If the clock of the A/D of codec 10 at the transmitting system I is faster than the clock of the D/A codec 80 at the receiving system 2, the slower codec 80 will lag the faster codec 10. The number of received CSP's will increase intolerably as the slower codec 80 is unable to process successive CSP's in real time. On the other hand, if the clock of the A/D of codec 10 is slower than the clock of the codec 80, codec 80 will lead the slow codec 10. Periodically there will be no received CSP for the faster codec 80 to process, forcing codec 80 to intolerably pause until the next CSP arrives. It should be noted that for full-duplex communication with clock skew, one end will lag while the other end will lead. The clock skew problem is not unique to DSVD applications and to full duplex operation of a communication system. Any speech communication system, in which the A/D clock on the transmitting end is skewed relatively to the D/A clock on the receiving end, will experience the lag/lead phenomena of speech samples.

When clock skew occurs, one possible practice has been for the controller to perform a crude correction whenever needed. When there are more packets than the codec can process in real time, the additional packet is discarded. If, on the other hand, the codec is not receiving packets regularly, certain packets can be duplicated to prevent pausing. If the clock skew is not too severe, then such a correction takes place once every few minutes, which may be perceptually acceptable. If, however, the clock skew is severe, then a correction might need to happen more frequently, up to once every few seconds. In this case, a crude correction will create perceptually unacceptable artifacts. Thus, it becomes essential for the DSVD system to be able to perform corrections to the speech packets such that the artifacts are eliminated.

A second problem associated with the DSVD system is the asynchronous operation of the controller and the speech decoder portion of the speech codec. The controller 30 receives the bit stream from the modem 40, demultiplexes the data packets from the CSP, which is put, one at a time, into the buffer 11. The speech codec 10 takes the CSP from the buffer 11 and processes it to produce analog speech. When the speech codec 10 finishes outputting of the previous frame, a new CSP should be ready for the decoder in the buffer 11. Due to the asynchronous controller to decoder CSP transfer, the next CSP might not be available to the decoder when required.

The third problem arises from the conflicting requirements of maintaining continuity and minimizing the delay of the speech across the communications channel while simultaneously and efficiently transmitting data in a multiplexing environment. In the absence of data packets, the CSP's are received at the local decoder and processed at regular intervals. During data packet transmission, the remote encoder continues to produce CSPs. To maintain speech continuity, these CSPs will have to be delayed by the remote controller until the data packet transmission is complete. During this time the local decoder will not receive a CSP and consequently will pause until the next CSP arrives producing a perceptually unpleasing stuttering effect. The maximum number of pending CSPs may be pre-determined for a given channel data transmission rate and maximum data packet size, and a buffer constructed at the remote decoder of equal size such that the remote decoder will always have at least one CSP to process. However, even for moderate channel data transmission rate and data packet size the corresponding decoder buffer size will be of such a size that the speech delay may become unacceptable. Reducing the data packet size or aborting data packet transmission will minimize this delay, but also significantly reduce the data transmission efficiency because more of the data packet will consist of overhead control information and less of data or frequent data packet retransmissions will be required respectively.

Therefore, it will be desirable to solve the clock skew problem associated with the operation of any speech communication system.

It will also be desirable to solve the problem of asynchronicity associated with the operation of speech decoders and controllers, as well as solving the problem of multiplexing speech packets with data packets.

SUMMARY OF THE INVENTION

A timing recovery scheme for packet speech in communication systems in general and in multiplexing environment in particular is disclosed. The timing recovery scheme is performed by the speech decoder and is transparent to the controller operation. The speech decoder utilizes the speech nature for smooth and perceptually unnoticeable timing recovery even under severe clock skew.

The controller and the speech decoder exchange packet speech in the form of CSP's through common buffers. Whenever excessive or missing speech packets are detected by the speech decoder it switches to a special corrective mode. If excessive speech data is detected, it is played out "faster" than usual. For the sake of illustration, this event will be denoted as a "slow" event, since the local decoder is slower relative to the remote encoder. If missing data is detected, the available data to the decoder is played out "slower" than usual. We will denote this event as a "fast" event, since the local decoder is faster relative to the remote encoder. For the slower event, some speech information has to be discarded, while for the faster event some speech-like information has to be synthesized and inserted.

The discarding or creating of speech information is done by the speech decoder in units, which can be frames, sub-frames, samples or any other multiplicity of samples. Manipulating silence or unvoiced units results in modified speech with perceptually unnoticeable quality degradation. In the preferred embodiment, sub-frames of 52 samples were chosen as a good compromise between complexity and performance.

In almost all modern speech decoders, such as CELP, the final stage of the decoder consists of a spectral shaping (commonly called LPC—"Linear Prediction Codes") synthesis filter followed by optional post-filtering. Manipulating the decoded signal at the excitation phase, before the final filters, adds to the perceptual naturalness of the synthesized speech. This timing recovery scheme, utilizing the above methods, results in a perceptually transparent effect on the manipulated speech even under severe clock skew.

The size of the buffer interfacing between the controller and the speech decoder should meet the needs of the timing recovery scheme. If the local speech decoder is slower than the remote speech encoder, it needs an additional space for an extra CSP. This excessive CSP will be played out fast when presented. If the local decoder is faster than the remote speech encoder, it needs a reserve of at least one unplayed CSP. This CSP will be played out slow in order to wait for the next CSP from the slower remote end. Hence, the basic structure of the buffer may comprise 3 locations for CSP's: one for holding a reserve CSP, one for holding the played out CSP and one for holding additional locations. However, extra CSP or missing CSP can be, temporarily, the result of the controller-decoder asynchronous CSP transfer. Since the decoder cannot distinguish between temporary extra/missing CSP due to an asynchronous controller-to-decoder CSP transfer or due to a genuine clock skew problem, four (4) padding CSP locations may be added, such that the buffer has seven (7) locations for CSPs. In this structure, one extra/missing CSP does not trigger the decoder for timing recovery operation.

This timing recovery seven (7) CSP buffer will also be shown to solve the problem of multiplexing CSPs and data packets while maintaining data packet transmission efficiency, speech continuity, and minimizing speech delay in a multiplexing environment.

BRIEF DESCRIPTION OF THE DRAWINGS

Further objects, features and advantages of the present invention will be understood by those skilled in the art in the following description, wherein.

DETAILED DESCRIPTION OF THE PREFERRED EMBODIMENT

1. Speech Modification Embedded in Speech Decoder

In almost all modern speech decoders, and in all CELP-type decoders, the final stage consists of a spectral envelope (LPC) filter followed by an optional post-filter. Hence, as noted above, speech modification might be embedded in the speech decoder for a perceptually more natural modified speech.

Figure 2:
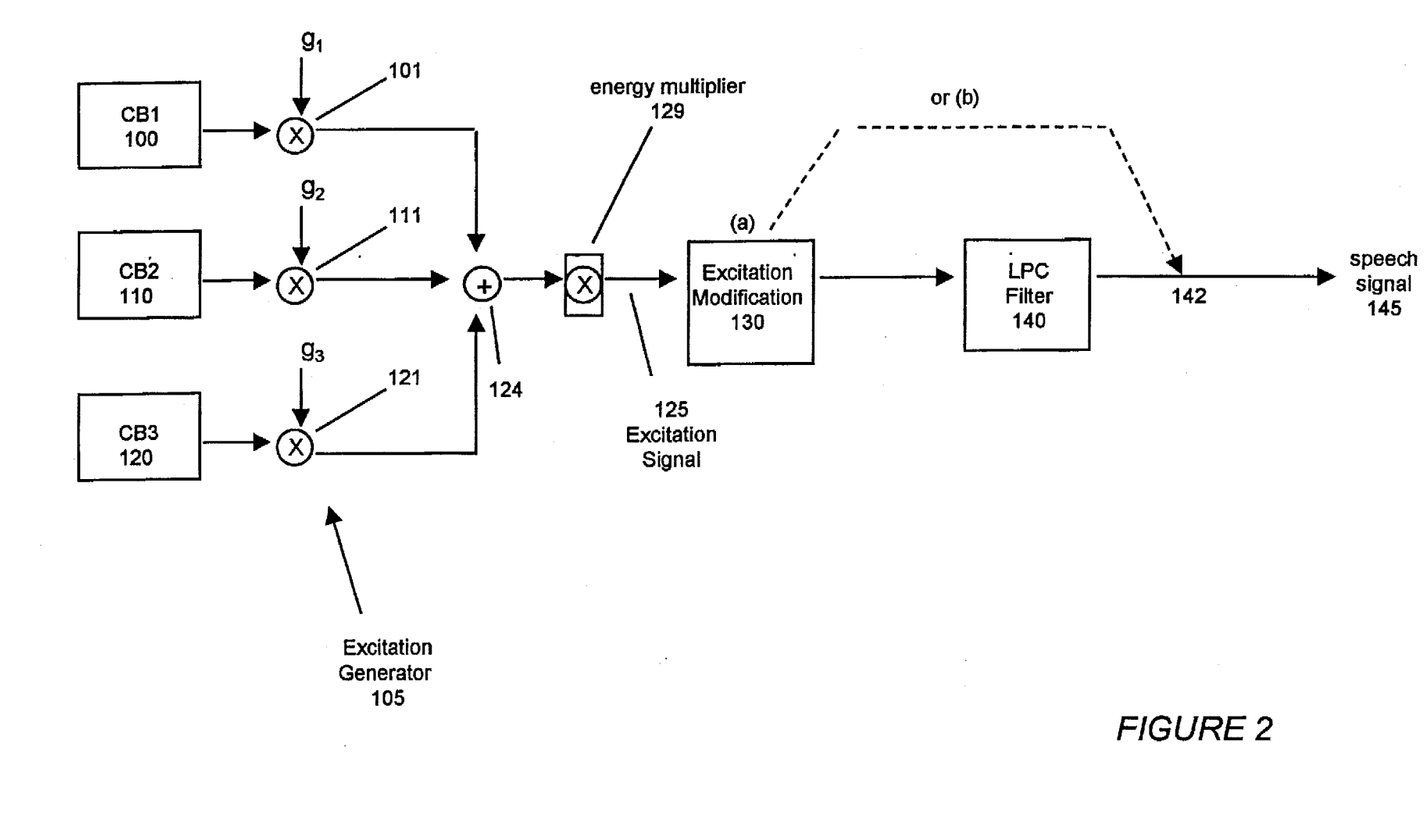
FIG. 2 is the simplified block diagram of a Code Excited Linear Prediction ("CELP") decoder which may be a part of speech codec.

FIG. 2 illustrates a simplified block diagram of a CELP decoder as may be implemented in the speech codec 10, 80 and in which the speech modification might be embedded in accordance with the present invention, Referring to FIG. 2, the CELP decoder takes the CSP received through a controller by a modem from a remote modem and generates the speech signal 145 for output. For each frame, a number of parameter codes am transmitted, which generally comprise codebook indices, gain, frame energy and LPC parameters.

The codebooks 100 (CB1), 110 (CB2) and 120 (CB3) consists of vectors which will be used to generate the excitation signal 125. More than 3 codebooks may be used in the CELP decoder, and one or a multiplicity of them are usually adaptive. The information in the codebooks are also compensated by some gain factors g1–g3 101, 111, 121, summed up at an adder 124 and a common energy multiplier 129. The result is called "short-term residual" or "excitation signal" 125. The LPC filter 140, through frequency envelope filtering, generates the synthesized output speech 145. Additional post-filter can be employed for enhanced speech quality, as will be appreciated by those skilled in the art.

Modification of the speech, such as deletion or insertion of units, can be carried out on the excitation signal 125 or on the speech signal 145. In either cases, manipulation of smaller duration units and silence or unvoiced units will result in better quality of the modified speech. In the preferred embodiment, unit deletion or insertion is done on the excitation signal 125, and the manipulated units are the speech coding "sub-frame" units. Since the sub-frame units are "natural" units of the speech decoder, they can be manipulated easily and with very low complexity.

It should be noted that the "fast" or "slow" event is detected when there is missing/extra CSP to the decoder, and since a CSP can represent a multiplicity of correction units, a multiplicity of deletions or insertions might be needed to correct one CSP.

Note that the excitation modification 130 in accordance with the present invention may either modify (a) the excitation signal 125, or (b) the speech signals 145 at node 142 when embedded in a CELP. However, it would be appreciated by those skilled in the art that modifying the excitation signal 125 may be more advantageous in that its output may be further smoothed by the LPC filter 140.

2. Clock Skew Correction

Figure 3A:
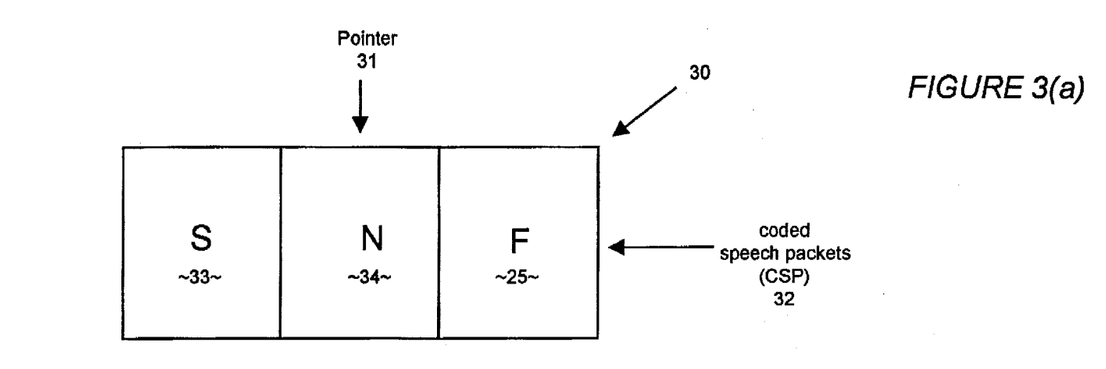
FIG. 3(a) shows a buffer and FIG. 3(b) shows a buffer in another embodiment.

FIG. 3(a) illustrates the schematic design of a buffer 30 to be implemented for clock skew correction. Functionally, the buffer 30 interfaces between the speech decoder portion of the codec (10/80, FIG. 1(a)) and the controller (30/60, FIG. 1(a)). The buffer 30 is filled by the controller and emptied by the decoder as "First-In, First-Out" (FIFO) buffer. The buffer 30 is partitioned into three sections: Slow 33, Normal 34, and Fast 35. The controller pushes the next CSP 32, which was received from the modem, into the buffer. Note that at initialization the controller pushes two CSP's into the buffer. The decoder then takes the next, or first-in-line, undecoded CSP from the buffer and decodes its content to produce a synthesized speech. While a CSP is being decoded by the decoder, the controller should get the next CSP from the modem, such that the next CSP will be in place as the previous CSP is decoded and played out. Note that the rate of playing out is determined by the D/A converter sampling clock (FIG. 1(b), 90) of the local decoder. If the local decoder D/A clock 90 is synchronized with the A/D clock of the remote encoder, and if the transmission path is fully synchronized, the decoder will always find the next CSP right after it finishes to decoded its present CSP.

If the local decoder D/A clock is slower than the remote encoder A/D clock, the remote encoder will generate, per time unit, more samples than the local decoder can output. For example, if the far-end A/D clock is 8080 Hz and the local D/A clock is 8000 Hz (a 10% clock skew), then extra 80 samples per second are generated by the far-end. If every CSP represents, for example, 240 samples, an extra CSP will be generated each 3 seconds.

In the very same way, if the local decoder D/A clock is faster than the far-end encoder A/D clock, the far-end encoder will generate, per time unit, less samples than the local decoder have to output during that period of time.

Referring to FIG. 3(a), the operation of the buffer 30 in accordance with the present invention will now be described. The buffer 30 is operated as a "two ways" stack buffer: the controller pushes a CSP from one side while the decoder pops a CSP from the other end. Note that the total operation is of a FIFO buffer. At initialization, the controller should push 2 CSP's into the buffer 30. If the decoder and the controller are synchronized and there is no clock skew, the decoder will pop a CSP from location 'N' (34), decode and output it, and will find the next CSP at the same location. If it finds the next CSP at location 'S' (33), the decoder knows that its D/A is too slow, triggering a "SLOW" event. If it finds the next CSP at location 'F' (35), the decoder knows that its D/A is too fast, triggering a "FAST" event.

It should be understood by those skilled in the art that "Fast", "Slow" or "Normal" modes are indicated by pointer 31, which points to the CSP in buffer 30 to be decoded next. The decoder starts to decode the first CSP when pointer 31 points to "N". When pointer 31 coincides with "N" 34, it is "Normal". When pointer 31 moves to "F" 35, it represents that the inbound flow is slower than the outbound flow, hence a "Fast" scenario. Conversely, when pointer 31 moves to "S" 33, the inbound flow is faster than the outbound flow, hence a "Slow" scenario.

In the case of a "SLOW" event the local decoder has to delete some samples in order to catch-up with the far-end encoder. In the case of a "FAST" event, the local decoder has to create and insert some samples, to let the far-end encoder catch-up with it. Note that clock skew correction is initiated by the detection of an extra or missing CSP, which corresponds to a frame of about 120–240 samples. Corrections may be done on any number of sub-units of the speech data in both "FAST" and "SLOW" situations. The "natural" correction units for the decoder are the frame, the sub-frame and the sample. A frame corresponds to a CSP, and deletion or insertion of a frame will correct the whole CSP. A frame is usually built of a few (typically 3–4) sub-frames, and a few sub-frame corrections are needed to correct the extra or missing CSP. Another correction unit can be the speech samples, and as many of the speech samples in a frame are needed for correcting the extra or the missing CSP. The perceptual quality of the correction is better for smaller correction units.

While corrections may take place any time, corrections done in silence or unvoiced unit result in better perceptive quality. Currently, a correction is done on silence or unvoiced sub-frames. The parameters used for classification are the energy and spectral slope, i.e. first reflection coefficient, which are parts of encoded information, as will be appreciated by those skilled in the art. The sub-frame unit is also a good compromise between implementation complexity, corrected speech quality and convergence time.

A correction does not need to take place immediately after it is detected. Referring to the previous example of a 10% clock skew, a CSP correction must be performed within 3 seconds. For a 208-sample frame, which is divided into 4 sub-frames, there are more than 100 frames or 400 sub-frames in 3 seconds, of which only four (4) sub-frames have to be corrected in order to solve the clock skew problem. Statistically, there should be enough silence or unvoiced units in this 100 frames to perform correction. A more robust system can than be achieved by adaptively adjusting the classification threshold.

For example, a strict set of threshold may be used when the correction starts so that only silence frames can be repeated or deleted. Then after certain number of frames during which no silence frame is found, the threshold can be relaxed so that unvoiced frames can be picked to achieve correction. Furthermore, a safeguard may be established to force a correction every 100 frames if no silence or unvoiced frame is found within that period. Also, correction frequency can be tracked such that if it is less than the predetermined value, usually the worst case of 10% skew, a stricter threshold can be applied to make sure that corrections happen only at silence frames. Those skilled in the art will be able to determine their own correction schemes based on their specific needs and resources.

Figure 4:
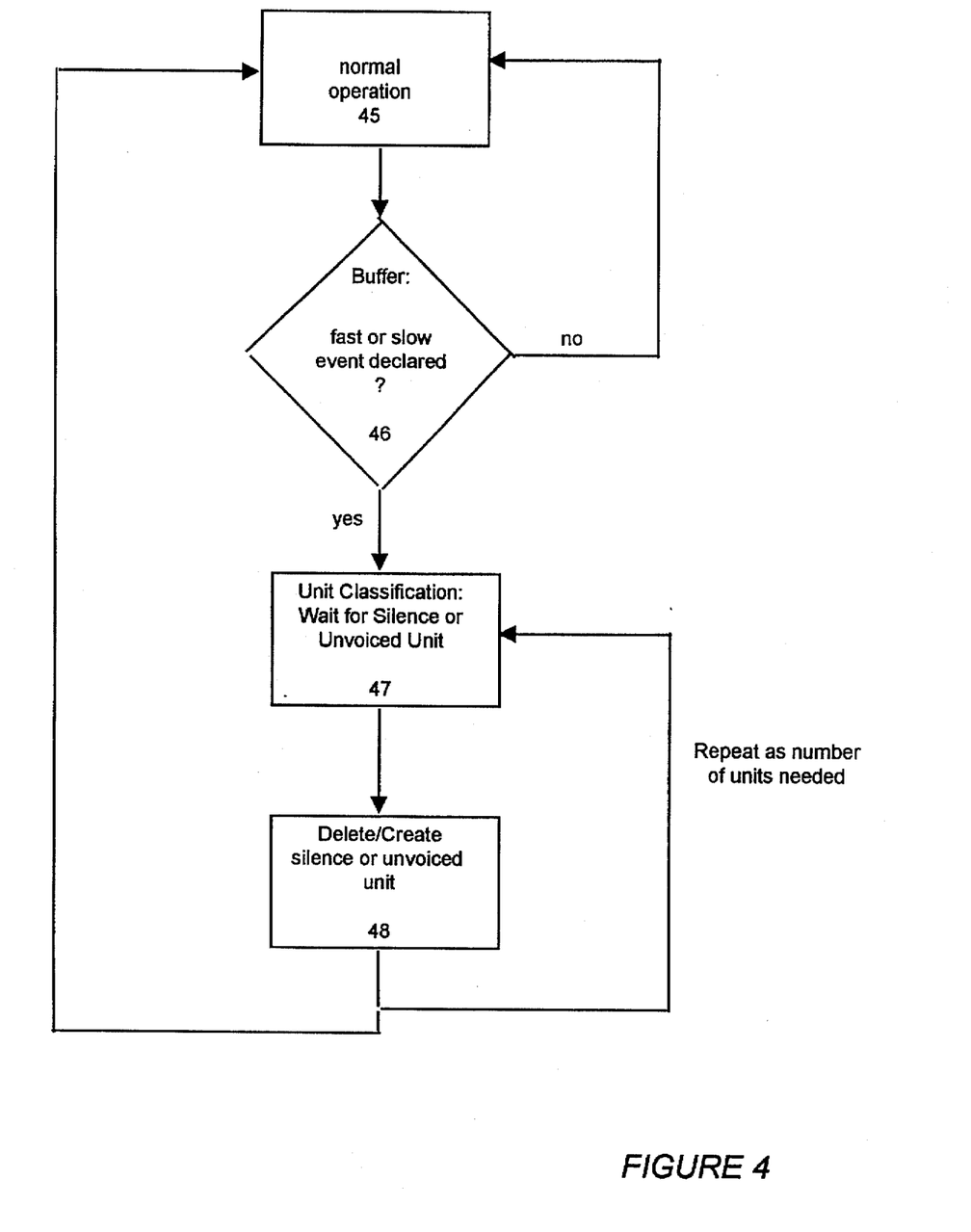
FIG. 4 is a flow chart illustrating the process of correction in accordance with the present invention.

Referring to FIG. 2, as described above, information in codebooks 100 to 120 are gain adjusted and summed to create the excitation signal 125. The excitation modification operation 130, if no correction is needed, would pass the excitation signal through to the LPC filter 140 to obtain the synthesized speech. When the local decoder is faster, i.e. insertion of data is needed, the excitation modification operation 130 waits until the excitation signal 125 has low energy before duplicating the silence or unvoiced sub-frame (or any other correction unit) and concatenating it to the sample stream of the excitation signal 125. As a result, for a 208 sample frame, the frame will now have 208 samples+ 52 samples=260 samples to synthesis and output. When the local decoder is slower, i.e. deletion of data is needed, the excitation modification operation 130 waits until the excitation signal 125 has low energy before deleting the silence or unvoiced sub-frame (or any other correction unit) from the sample stream of the excitation signal 125. As a result, for a 208 sample frame, the frame will now have 208 samples−52 samples=156 samples to synthesis and output. Note that the "correction unit" is assumed to be a sub-frame, i.e. 52 samples, in this example. When four (4) sub-frames are corrected, a whole frame is thus corrected. Alternatively, this correction unit can also be a silence or unvoiced frame, a sample or samples of silence and unvoiced frame. FIG. 4 illustrates a flow chart of the timing recovery scheme in accordance with the present invention. During normal operation 45, the local decoder (10, FIG. 1(a)) monitors the buffer (30, FIG. 3(a) or 11, FIG. 1(a)) to determine whether it is a FAST or SLOW event. Upon either a FAST or SLOW event, the excitation modification operation (130, FIG. 2) waits for a unit of silence or unvoiced frame to occur, whether the unit is a frame, a sub-frame, a sample or any combination thereof. When detected, the silence or unvoiced unit is either duplicated or deleted in either FAST or SLOW situation 48. This step is repeated as the number of units are needed for correction and then looped back to normal operation 45.

The above clock skew problem and the method for its correction have been presented in the frame work of a DSVD system, as a two way communication system which multiplexes speech, data and possibly video. However, clock skew appears in any communication system where the clock of one end A/D converter is not synchronized with the other end clock of the D/A converter. The correction scheme described above can be applied to such a system, regardless of the other components such as the controller or the modem, regardless of the mode of transmission and regardless of any additional data multiplexing.

3. Controller Asynchronicity

As previously described, the controllers often do not operate synchronously since there is generally a lack of common clocking scheme among the speech codecs 10, 80 and the controllers 30, 60 for the DSVD system as described in FIG. 1(a). A typical asynchronicity-related problem, even in the absence of clock skew, is that the CELP decoder may take a frame (CSP) from the buffer (30, FIG. 3(a)) and when required to take the next frame, it finds itself having to take the frame indicated by the faster "F" 25 or slower "S" 33 pointer, even though there is no fast or slow problem.

Figure 3B:
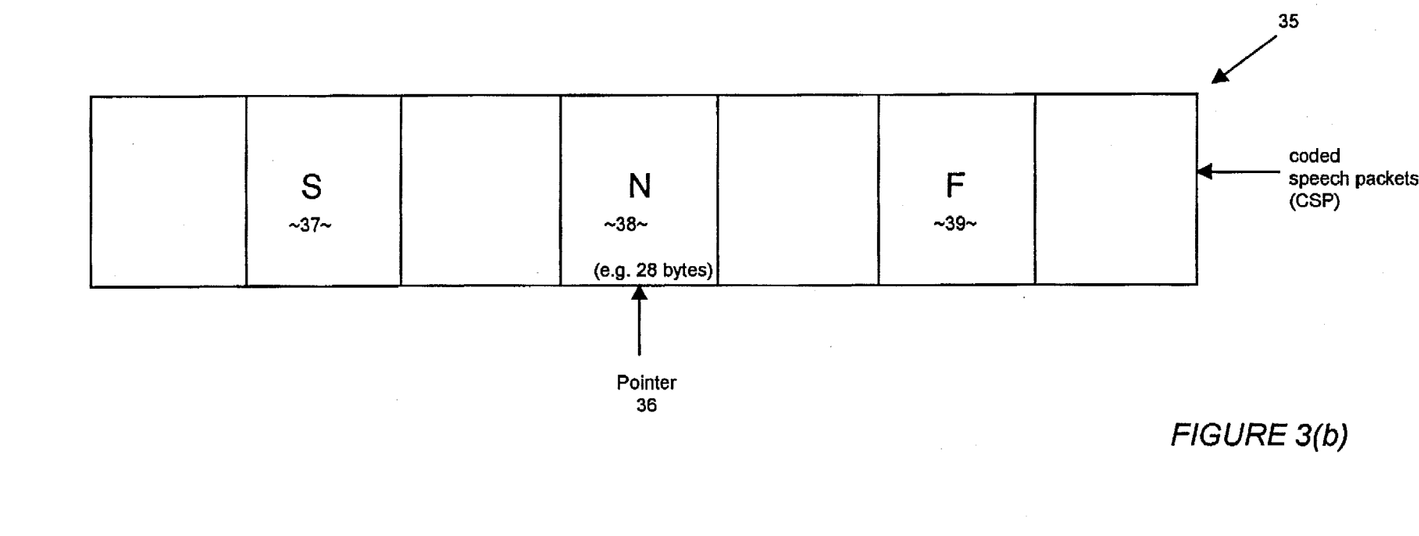

FIG. 3(b) illustrates a buffer 35 capable of safeguarding the system from the asynchronous controllers or others. Instead of having space for just 3 frames as in FIG. 3A, the buffer 35 is implemented to provide added protection of one extra frame to both sides of the fast 39 and slow 37 frames. The buffer 35 can therefore allow the decoder to operate in any of the 2 extra frames around the Normal frame 38 without having to declare a Fast or Slow event. When either a Fast or Slow event is declared, the decoder can still compensate for asynchronicity with the Slow 37, Normal 38 and Fast 39 frames.

With the expanded buffer 35, the impact of controller asynchrony, as well as clock skew, upon the DSVD system can be eliminated.

4. Controller Multiplexing of Speech and Data Packages

Reference is to FIG. 1(a). The controller 30 of DSVD system as shown may also multiplex speech data from the speech codec 10 with data from the data terminal 20. When speech data are packaged, bulk delay is introduced as a number of CSPs are often held by the controller as part of the multiplexing scheme before they are transmitted to the decoder in the speech codec 80.

In the absence of controller-to-decoder asynchronous CSP transfer and clock skew, the buffer in FIG. 3(b) maintains a constant four (4) CSPs when there is no intervening data packet transmission. With controller-to-decoder asynchronous CSP transfer, the buffer may contain three (3) to five (5) CSPs. With clock skew added, the buffer may have as few as one (1) or as many as seven (7) CSPs.

To preclude CSP buffer underflow during data packet transmission, the transmission must be aborted, the CSP buffer size increased, or the data packet size limited for a given channel data transmission rate. Aborting the data packet transmission requires inefficient and frequent data packet retransmissions, and increasing the CSP buffer size significantly contributes to the speech delay. Therefore, to maintain data transmission efficiency and speech continuity without adding to the speech delay, for a given channel data transmission rate, the data packet size is restricted. No more than four (4) CSPs may be processed during a data packet transmission.

If the initial number of CSPs in the buffer when the first data packet is transmitted is four (4) or more, then the buffer will not underflow since the data packet size has been restricted such that a maximum of four (4) CSPs may be processed during a data packet transmission. It is possible that the number of CSPs in the buffer will reach two (2), at which point the clock skew correction for "Fast" will be initiated and an additional frame of speech created and inserted. This additional frame of speech will be removed whenever the CSP transmission resumes and the CSP buffer extends to six (6), thereby initiating the clock skew correction for "Slow".

If, on the other hand, the initial number of CSPs in the buffer is less than four (4) and the maximum data packet size is used, then the first data packet transmission will cause the local decoder to process all of the CSPs, emptying the buffer and consequently pausing the decoder until the next four (4) CSPs are received and the CSP pointer is pointing to 'N' (38). Now that the number of CSPs in the buffer is re-established at four (4), the CSP buffer will not run out of CSPs and the decoder will not pause during subsequent alternating data packet and CSP transmissions.

When the data packet transmission is complete, the delayed CSPs will be transmitted and additional CSPs may be generated while this transmission occurs. Therefore it is possible for the decoder to receive a number of successive CSPs greater than four (4). Seven (7) CSPs is the buffer size currently required, which is sufficient to prevent buffer overflow for the restricted data packet size discussed above. The clock skew correction for "Slow" will be initiated when six (6) CSPs are in the buffer to return the number to four (4) for minimum speech delay.

It is possible that the decoder will not receive CSPs at regular intervals regardless of data packet transmission. This loss of CSPs may or may not be deliberate. For example, to increase the data packet transmission throughput, the remote controller may elect not to transmit encoder CSPs during periods of no speech activity. The number of lost CSPs will be typically much greater than four (4) which consequently forces an underflow condition at the decoder buffer. Until CSP transmission is resumed the local decoder may choose to repeat decoding of one or more prior CSPs whose encoded speech parameters individually or jointly may be modified in some predetermined fashion, mute the decoder output, generate and playback a pseudo random noise signals or deterministic signals both having energy levels chosen by some predetermined means to be consistent with the energy of the background noise experienced by the remote encoder, or any combination of the above. Similar to receiving the first CSPs, only after four (4) CSPs have been placed into the buffer does decoding resume. As described above, four (4) CSPs are necessary for proper timing recovery operation.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

We claim:

1. An apparatus for timing recovery in a communication system, the communication system comprising a local receiver for receiving from a remote transmitter a plurality of coded speech packets ("CSP") comprising a plurality of speech parameters, and a speech codec coupled to said local receiver for decoding said speech parameters extracted from said CSPs into excitation frames, said excitation frames being input into a linear prediction code filter ("LPC filter") to convert said excitation frames into speech frames, the apparatus comprising:

a buffer coupled to said speech codec for temporarily buffering a predetermined number of said CSPs;

mode detection means coupled to said buffer for determining whether said buffer is in either one of fast and slow modes of operation;

excitation detection means coupled to said speech codec for determining whether at least one speech parameter of a CSP satisfies at least one predetermined threshold;

correction means coupled to said speech codec for performing a correction to at least a predetermined sub-division of one of said excitation frames, said correction means, operative in said FAST event, duplicating said predetermined sub-division of one of said excitation frames, prior to said LPC filter, when at least one speech parameter satisfies said at least one predetermined threshold, said correction means, operative in said SLOW mode, deleting said predetermined sub-division of one of said excitation frames, prior to said LPC filter, when at least one speech parameter satisfies said at least one predetermined threshold.

2. An apparatus according to claim 1, wherein:

said buffer comprises 3 locations for buffering CSPs, said buffer receives an inbound flow of CSPs from said local controller and forwards an outbound flow of CSPs to said speech codec;

said mode detection means determines if said outbound flow of said buffer is either one of faster and slower than said inbound flow by more than one location of said buffer, and if slower by more than one location, declares a SLOW event and if faster, declares a FAST event.

3. An apparatus according to claim 2, further comprising a timing unit coupled to said correction means for performing a correction to said predetermined sub-division of said excitation frame when a predetermined time period expires if said correction means has not been operative in said predetermined time period.

4. An apparatus according to claim 2, further comprising:

accumulation means for tracking the frequency of said FAST and SLOW events in a predetermined time period; and modified excitation detection means for either one of restricting and relaxing said at least one predetermined threshold to a second predetermined threshold if the frequency of said FAST and SLOW events in said predetermined time period is either one of below and above a predetermined number.

5. An apparatus according to claim 1, wherein said mode detection means declares one of FAST and SLOW events when said outbound flow is different from said inbound flow by more than 2 locations in said buffer.

6. An apparatus according to claim 5, further comprising a timing unit coupled to said correction means for performing a correction to said predetermined sub-division of one of said excitation frames when a predetermined time period expires if said correction means has not been operative in said predetermined time period.

7. An apparatus according to claim 5, further comprising:

accumulation means for tracking the frequency of said FAST and SLOW events in a predetermined time period; and modified excitation detection means for either one of restricting and relaxing said at least one predetermined threshold to a second predetermined threshold if the frequency of said FAST and SLOW events in said predetermined time period is either one of below and above a predetermined number.

8. An apparatus according to claim 1, further comprising a timing unit coupled to said correction means for performing a correction to said predetermined sub-division of said excitation frame when a predetermined time period expires if said correction means has not been operative in said predetermined time period.

9. An apparatus according to claim 1, further comprising:

accumulation means for tracking the frequency of said FAST and SLOW events in a predetermined time period; and modified excitation detection means for either one of restricting and relaxing said at least one predetermined threshold to a second predetermined threshold if the frequency of said FAST and SLOW events in said predetermined time period is either one of below and above a predetermined number.

10. An apparatus for timing recovery in a communication system, the communication system comprising a local receiver for receiving from a remote transmitter a plurality of coded speech packets ("CSP") comprising a plurality of speech parameters, and a speech codec coupled to said local receiver for extracting said speech parameters from said CSPs into excitation frames, said excitation frames being input into a linear prediction code filter ("LPC filter") to convert said excitation frames into speech frames, the apparatus comprising:

a buffer coupled to said speech codec for temporarily buffering a predetermined number of said CSPs;

mode detection means coupled to said buffer for determining whether said buffer is in either one of fast and slow modes of operation;

excitation detection means coupled to said speech codec for determining whether at least one speech parameter of a CSP satisfies at least one predetermined threshold;

correction means coupled to said speech codec for performing a correction to at least a predetermined sub-division of one of said speech frames, said correction means, operative in said FAST event, duplicating said predetermined sub-division of one of said speech frames, subsequent to said LPC filter, when at least one speech parameter satisfies said at least one predetermined threshold, said correction means, operative in said SLOW mode, deleting said predetermined sub-division of one of said speech frames, subsequent to said LPC filter, when at least one speech parameter satisfies said at least one predetermined threshold.

11. An apparatus according to claim 10, further comprising:

accumulation means for tracking the frequency of said FAST and SLOW events in a predetermined time period; and modified excitation detection means for either one of restricting and relaxing said at least one predetermined threshold to a second predetermined threshold if the frequency of said FAST and SLOW events in said predetermined time period is either one of below and above a predetermined number.

12. An apparatus according to claim 10, wherein:

said buffer comprises 3 locations for buffering CSPs, said buffer receives an inbound flow of CSPs from said local controller and forwards an outbound flow of CSPs to said speech codec;

said mode detection means determines if said outbound flow of said buffer is either one of faster and slower than said inbound flow by more than one location of said buffer, and if slower by more than one location, declares a SLOW event and if faster, declares a FAST event.

13. An apparatus according to claim 10, wherein said mode detection means declares one of FAST and SLOW events when said outbound flow is different from said inbound flow by more than 2 locations in said buffer.

14. An apparatus for timing recovery in a speech and data multiplexed communication system, the communication system receiving from a remote transmitter a multiplexed transmission of a plurality of data packets and a plurality of coded speech packet ("CSP") comprising a plurality of speech parameters, said communication system comprising a local speech codec for extracting said speech parameters from said CSPs into excitation frames, said excitation frames being input into a linear prediction code filter ("LPC filter") to convert said excitation frames into speech frames, the apparatus comprising:

a buffer coupled to said speech codec for temporarily buffering a plurality of said CSPs;

mode detection means coupled to said buffer for determining whether said buffer is in either one of fast and slow modes of operation;

excitation detection means coupled to said speech codec for determining whether at least one speech parameter of a CSP satisfies at least one predetermined threshold;

correction means coupled to said speech codec for performing a correction to at least a predetermined sub-division of one of said excitation frames, said correction means, operative in said FAST event, duplicating said predetermined sub-division of one of said excitation frames, prior to said LPC filter, when at least one speech parameter satisfies said at least one predetermined threshold, said correction means, operative in said SLOW mode, deleting said predetermined sub-division of one of said excitation frames, prior to said LPC filter, when at least one speech parameter satisfies said at least one predetermined threshold.

15. An apparatus according to claim 14, wherein said buffer comprises locations, said buffer buffering at most 4 CSPs for a predetermined data packet transmission rate from said remote transmitter to said local modem so as to prevent said buffer from underflowing during data packet transmission.

16. An apparatus according to claim 15, wherein said mode detection means declares one of FAST and SLOW events when said outbound flow is different from said inbound flow by more than 2 locations in said buffer.

17. An apparatus according to claim 14, wherein said mode detection means declares one of FAST and SLOW events when said outbound flow is different from said inbound flow by more than 2 locations in said buffer.

18. An apparatus according to claim 18, wherein:

said buffer comprises 3 locations for buffering CSPs, said buffer receives an inbound flow of CSPs from said local controller and forwards an outbound flow of CSPs to said speech codec;

said mode detection means determines if said outbound flow of said buffer is either one of faster and slower than said inbound flow by more than one location of said buffer, and if slower by more than one location, declares a SLOW event and if faster, declares a FAST event.

19. In a digital communication system for communicating multiplexed coded speech packets ("CSPs"), data packets and video transmission between a local terminal and a remote terminal, said local terminal comprising a local modem for receiving multiplexed data packets and CSPs comprising a plurality of speech parameters, a local speech codec for extracting said speech parameters from said CSPs into excitation frames, said excitation frames being input into a linear prediction code filter ("LPC") to convert said excitation frames into speech frames, a buffer for buffering said CSPs between said local modem and said local speech codec, said buffer having an inbound flow and an outbound flow, a method of maintaining timing control between said local and remote terminals, the method comprising the steps of:

a) buffering a predetermined number of CSPs in said buffer;

b) forwarding a CSP to said speech codec for processing;

c) comparing said outbound flow with said inbound flow of CSPs in said buffer;

d) if said outbound flow is greater than said inbound flow by a predetermined difference, declaring a FAST event;

e) if said outbound flow is less than said inbound flow by a predetermined difference, declaring a SLOW event;

f) monitoring at least one speech parameter of said CSP being processed by said speech codec to determine if said at least one speech parameter satisfies at least one predetermined threshold;

g) for a FAST event, duplicating one predetermined sub-division of one of said excitation frames by said local speech codec when said at least one speech parameter satisfies said at least one predetermined threshold;

h) for a SLOW event, deleting said predetermined sub-division of one of said excitation frames by said speech codec when said at least one speech parameter satisfies said at least one predetermined threshold, wherein the FAST and SLOW events are corrected.

20. The method according to claim 19, wherein said predetermined difference in the Steps (d) and (e) is 1 CSPs.

21. The method according to claim 19, wherein said predetermined difference in the Steps (d) and (e) is at least 2 CSPs so as to provide more robust system for said buffer.

22. The method according to claim 19, further comprising the steps of:

i) accumulating the number of said FAST and SLOW events in a predetermined time period;

j) relaxing said at least one predetermined threshold in said Step f) after said predetermined time period to a second predetermined threshold if the number of said FAST and SLOW events is below a predetermined number.

23. The method according to claim 14, wherein, for a predetermined data packet transmission rate between said remote terminal and local terminal, said local speech codec decodes at most a predetermined number of CSPs from said buffer during data packet transmission to prevent buffer underflow.

24. The method according to claim 19, wherein said speech codec performs either one of duplicating and deleting if a predetermined time expires regardless whether said speech parameter satisfies said predetermined threshold.

25. The method according to claim 19, wherein, when said packet speech is multiplexed with data packet transmission, said speech codec performs a correction to reset said buffer in a predetermined time period, such that under a predetermined modem speed and constrained data packet size, at most one buffer reset will occur in any period of alternating data packet and CSP transmissions.

* * * * *